(12) United States Patent
Walsh et al.

(10) Patent No.: US 6,361,080 B1
(45) Date of Patent: Mar. 26, 2002

(54) METHOD FOR ATTACHING AN ANSI STUB-END FLANGED CONNECTOR TO A COMPOSITE TUBULAR MEMBER

(75) Inventors: Thomas J. Walsh; Joel D. Shaw, both of Houston; Chris A. Lundberg, Kingwood; Harris A. Reynolds, Jr., Houston, all of TX (US)

(73) Assignee: Hydril Company, Houston, TX (US)

( * ) Notice: Subject to any disclaimer, the term of this patent is extended or adjusted under 35 U.S.C. 154(b) by 0 days.

(21) Appl. No.: 09/644,803

(22) Filed: Aug. 23, 2000

(51) Int. Cl.$^7$ ................................. F16L 55/00
(52) U.S. Cl. .................. 285/55; 285/222.1; 285/222.3; 285/405
(58) Field of Search ............. 285/222.1–222.5, 285/290.1–290.4, 55, 405, 368, 412

(56) References Cited

U.S. PATENT DOCUMENTS

| | | | |
|---|---|---|---|
| 2,837,354 A | * | 6/1958 | Thibault et al. ......... 285/222.4 |
| 3,661,670 A | | 5/1972 | Pierpont, Jr. |
| 3,679,237 A | | 7/1972 | De Angelis |
| 3,769,127 A | | 10/1973 | Goldsworthy et al. |
| 3,899,006 A | * | 8/1975 | Champleboux et al. .. 285/222.5 |
| 4,118,262 A | | 10/1978 | Abbott |
| 4,185,472 A | | 1/1980 | Yates et al. |
| 4,187,135 A | | 2/1980 | Yates et al. |
| 4,225,158 A | * | 9/1980 | Puechavy ................ 285/222.2 |
| 4,248,062 A | | 2/1981 | McLain et al. |
| 4,279,275 A | | 7/1981 | Stanwood et al. |
| 4,310,183 A | | 1/1982 | Szalvay |
| 4,380,443 A | | 4/1983 | Federmann et al. |
| 4,385,644 A | | 5/1983 | Kaempen |
| 4,530,379 A | | 7/1985 | Policelli |
| 4,647,078 A | | 3/1987 | Lundy |
| 4,701,231 A | | 10/1987 | Peters et al. |
| 4,810,010 A | | 3/1989 | Jones |
| 4,813,715 A | | 3/1989 | Policelli |
| 4,830,409 A | | 5/1989 | Freeman |
| 4,834,932 A | | 5/1989 | Salzman et al. |
| 4,865,356 A | | 9/1989 | Moore et al. |
| 4,875,717 A | | 10/1989 | Policelli |
| 5,082,314 A | | 1/1992 | Aubry et al. |
| 5,248,169 A | | 9/1993 | Barbe et al. |
| 5,330,236 A | | 7/1994 | Peterjohn et al. |
| 5,332,049 A | | 7/1994 | Tew |
| 5,378,023 A | | 1/1995 | Olbrich |
| 5,443,099 A | * | 8/1995 | Chaussepied et al. .... 285/222.3 |
| 5,520,422 A | | 5/1996 | Friedrich et al. |
| 5,636,878 A | | 6/1997 | Millward et al. |
| 5,685,576 A | | 11/1997 | Wolfe et al. |
| 6,176,525 B1 | * | 1/2001 | McMillan et al. ............. 285/55 |

OTHER PUBLICATIONS

"Filament Winding Composite Structure Fabrication," Dec. 17, 1995; Chapter 7–"Composite Joints", pp. 7–1 through 7–17.

* cited by examiner

*Primary Examiner*—Lynne H. Browne
*Assistant Examiner*—Aaron Dunwoody
(74) *Attorney, Agent, or Firm*—Rosenthal & Osha L.L.P.

(57) ABSTRACT

A method is disclosed for coupling a stub end flanged connector to a fiber reinforced plastic pipe. The method includes tapering an end of the fiber reinforced plastic pipe on the outside surface of its fiber overwrap. An inside surface of a stub end connector is correspondingly tapered. The stub end connector is then bonded to the fiber reinforced plastic pipe. A liner of the plastic pipe is then flared to correspond to a flared end of the stub end connector. Then at least one stiffness transition layer is bonded over the plastic pipe and the stub end connection, over an axial span at least including a termination of the taper in the stub end connector.

18 Claims, 2 Drawing Sheets

METHOD FOR ATTACHING AN ANSI STUB-END FLANGED CONNECTOR TO A COMPOSITE TUBULAR MEMBER

FIELD OF THE INVENTION

The invention relates generally to the field of fiber reinforced plastic pipe and tubing. More specifically, the invention relates to methods for attaching coupling devices to such pipes and tubing.

BACKGROUND OF THE INVENTION

Wound-fiber-reinforced plastic products are well known in the art. Some very useful wound-fiber reinforced plastic products include conduit or tubing used to carry fluids. This type of conduit is typically made by winding glass, carbon or other reinforcing fibers about a tube mandrel, a liner or other tube form. The fibers are wound in a substantially helical pattern. The fibers may be impregnated with resin prior to winding or the resin may be applied after winding. The resin is then cured in some manner to create the finished product.

Pipe and tubing is often used in a manner which requires coupling and uncoupling the pipe or tubing at selected locations along the length thereof. One type of releasable coupling known in the art is called an ANSI stub-end flange connector. This type of connector includes a disk-shaped flange having bolt holes arranged in a circle near the circumference of the flange, and a flared "stub end" connector, which is compressibly coupled to a corresponding flange and stub end connector by tightening bolts positioned through the bolt holes of both flanges. The stub end connectors may be sealed compressibly against each other by a gasket, o-ring or other sealing device. Typically, the flange and stub end connectors are made of steel or other high strength metal.

Using ANSI stub end flanged connectors known in the art to couple wound fiber reinforced plastic tubing has proven difficult primarily because it is difficult to form a pressure resistant bond to the lining material commonly used in fiber reinforced plastic pipe, and the pipe and the stub end flanged connections have such different bending stiffness that mechanical failure is common.

What is needed is a method for coupling fiber reinforced plastic pipe to a stub end flanged connector that is reliable and strong.

SUMMARY OF THE INVENTION

One aspect of the invention is a method for coupling a stub end flanged connector to a fiber reinforced plastic pipe. The method includes tapering an end of the fiber reinforced plastic pipe on the outside surface of its fiber overwrap. An inside surface of the stub end connector is correspondingly tapered. The stub end connector is then bonded to the fiber reinforced plastic pipe. A liner in the plastic pipe is then flared to correspond to a flared end of the stub end connector. Then at least one stiffness transition layer is bonded over the plastic pipe and the stub end connection. The stiffness transition layer extends over an axial span at least including the termination of the stub end connector. One embodiment of the stiffness transition layer includes fiber braid impregnated with resin.

One embodiment of the method of the invention includes bonding a second stiffness transition layer on top of the first stiffness transition layer. The second stiffness transition layer is generally not as long as the first transition layer, but should include in its span the termination of the stub end connector.

Other aspects and advantages of the invention will be apparent from the following description and the appended claims.

DETAILED DESCRIPTION

In general, the invention provides a method for connecting a relatively high bending stiffness coupling element to a tube or conduit having a relatively low bending stiffness. The method according to the invention includes providing a stiffness transition zone between the coupling element and the tube. The stiffness transition zone reduces the likelihood of failure of the coupling at a "step" like connection between a high stiffness coupling and a lower stiffness tube.

Figure 1:
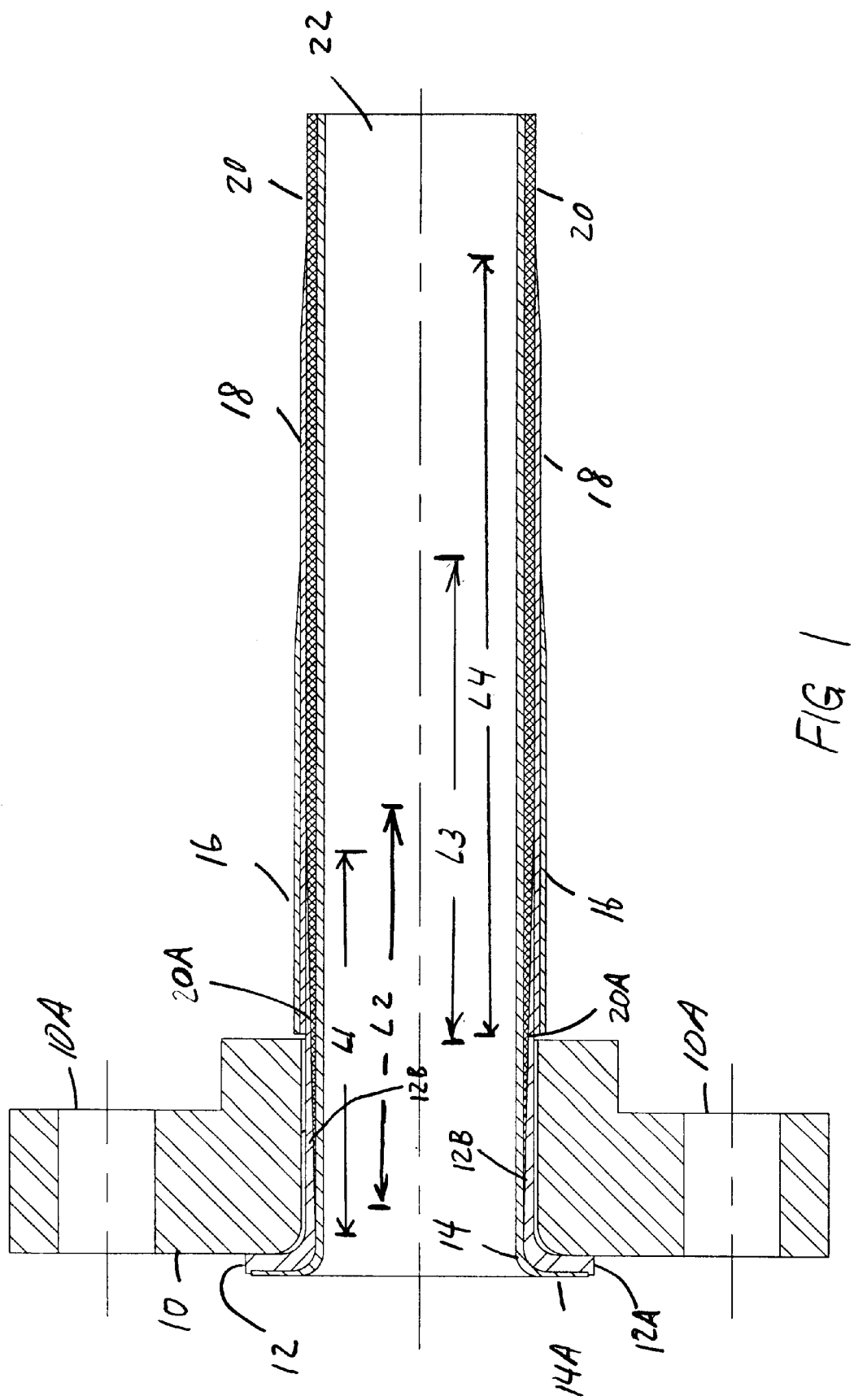
FIG. 1 shows an example of one embodiment of a connection according to the invention.

One example of a flanged coupling made according to the invention is shown in FIG. 1. A wound fiber-reinforced plastic tube 22 in this example includes a thermoplastic liner 14 in the center thereof. The liner 14 serves as an impermeable conduit to carry fluid therein. The liner 14 in this example is made from a plastic sold under the trade name "Carilon" by Shell Oil Company, Houston, TX. The material from which the liner 14 is made, however, is a matter of choice for the designer and is not a limitation on the invention. The liner 14 is overwrapped by at least one resin-impregnated fiber layer 20, to provide mechanical strength (including burst strength) to the tube 22. Some types of tube may include more than one wound-fiber overwrap layer, therefore the number of such overwrap layers is not intended to limit the invention.

The connector includes a coupling known as an "ANSI stub-end flanged connector". The ANSI stub end flanged connector includes a generally disk-shaped flange 10 having bolt holes 10A therein for coupling to a similarly configured, corresponding flange (not shown). The coupling also includes a "stub end connector" 12 having a flared end 12A thereon, which is adapted to be compressibly, sealingly joined to the flared end of a corresponding stub end connector (not shown) when the coupling mated to a corresponding stub end connector (not shown). Typically, the flared end 12A will have a radius suitable to reduce the possibility of failure of the stub end connector 12. Means for compressibly sealing a stub end connector to another stub end connector are known in the art.

In this embodiment, the stub end connector 12 includes a taper 12B on its internal diameter, opening toward the end opposite the flared end 12A. The taper 12B subtends an angle of about 1½ degrees in this embodiment, and extends approximately from the laterally innermost part of the flare end 12A along a length shown as L1 in FIG. 1. The taper 12B on the stub end connector 12 is adapted to substantially correspond to a similar taper 20A formed in the exterior overwrap fiber layer 20 on the plastic tube 22. The taper 20A on the tube 22, therefore, also subtends an angle of about 1½ degrees in this embodiment, and extends over a length L2. When the taper 20A is formed in the fiber layer 20, it preferably begins so that a selected length of the liner 14 is exposed for forming therein a flared end 14A to correspond to the inner surface of the flared end 12A of the stub end connector 12. The selected angle for the taper on both the stub end connector 12 and the fiber layer 20 has been shown to provide a good balance between maintaining the burst strength of the connector and having good resistance to bending-induced failure at the juncture of the tube 22 and the connector. When forming the connection according to this embodiment of the invention, the taper 20A is formed in the fiber layer 20 using an instrument such as one sold under the trade name "Ratchet Pro", by Ideal Specialties Company.

After forming the taper 20A in the fiber layer 20, the flange 10 can be positioned on the tube 22 out of the way of the connection to be formed. The stub end connection 12 can then be inserted onto the taper 20A on the fiber layer 20. An adhesive, such as 2-part epoxy or the like having suitable bonding strength, can be used to affix the stub end connection 12 to the exterior of the tube 22 on the taper 20A.

After the stub end connection 12 is bonded to the tapered end 20A of the tube 22, the exposed end of the liner 14 should then be flared or "swaged" ( to form flare 14A) to conform to the flared end 12A of the stub end connector 12. Typically, swaging is performed by heating the liner 14 to a temperature which enables easy forming or reshaping of the liner material. The outer end of the liner flared end 14A preferably matches the contour of the outer end of the flared end 12A of the stub end connector 12. After the liner 14 is swaged, the flange 10 can be moved along the tube 22 to the flared end of the tube 22 and stub end connector 12.

After the flared end 14A is formed in the liner 14, and the flange 10 is moved into position, at least one stiffness transition layer is applied to the exterior of the tube 22 in the axial location of the taper 20A in the fiber layer 20 and the taper 12B in the stub end connection 12. In this embodiment, there are two such stiffness transition layers. A first stiffness transition layer 18 extends approximately from the "back" edge of the flange 10 (the edge opposite the one in contact with the mating flange) to a length well past the end of the taper, this length shown as L3 in FIG. 1. In this embodiment, the first stiffness transition layer can be formed from resin impregnated glass fiber braid. This braid should be positioned on the outside of the tube 22 prior to attaching the stub end connector 12, so that it may be moved into position, impregnated with resin and cured on the outside of the tube 22 after forming the flared end 14A into the liner 14.

In this embodiment, the braid 18 having uncured resin thereon can be wrapped on its exterior surface with heat shrinkable tape (not shown). The shrink tape (not shown) is then heated so that it shrinks and compresses the braid 18. The resin is cured in the manner associated with the particular type of resin used. After curing the resin, the shrink tape (not shown) can be removed.

This embodiment, as previously explained, also includes a second stiffness transition layer 16 applied to the exterior of the first stiffness transition layer 18, and extending axially approximately from the back face of the flange 10 to a position past end of the taper 20A/12B. The axial span of the second stiffness transition layer is shown in FIG. 1 as L4. The second stiffness transition layer 16 in this embodiment is made from carbon fiber impregnated with resin. The second stiffness transition layer 16 provides additional resistance to pressure-induced radial expansion of the tube 22 and the stub end connector 12, particularly at the end of the taper 12B thereon. The taper 12B on the stub end connector 12 is such that the wall thickness is insufficient at the taper 12B end to prevent cracking of the stub end connector 12 under radial expansion from internal pressure. The second stiffness transition layer 16 can reduce the incidence of such cracking beyond that provided by the first stiffness transition layer 18. Making the second stiffness transition layer 16 is similar to making the first stiffness transition layer 18.

Typically, a carbon fiber braid will be applied, dry, to the exterior of the tube prior to attaching the stub end connector 12. After the first stiffness transition layer 18 is formed, the fiber braid can be moved to the position shown in FIG. 1, resin applied to the carbon fiber braid, and the resin cured to form the second stiffness transition layer 16. The carbon fiber braid may be wrapped with heat shrinkable tape as is done for the first stiffness transition layer. In one embodiment, the glass fiber braid forming the first stiffness transition layer 18, and the carbon fiber braid forming the second stiffness transition layer 16 can both be moved to their final positions on the exterior of the stub end connector 12 and tube 22, impregnated with resin, wrapped with shrink tape and cured at the same time.

Figure 2:
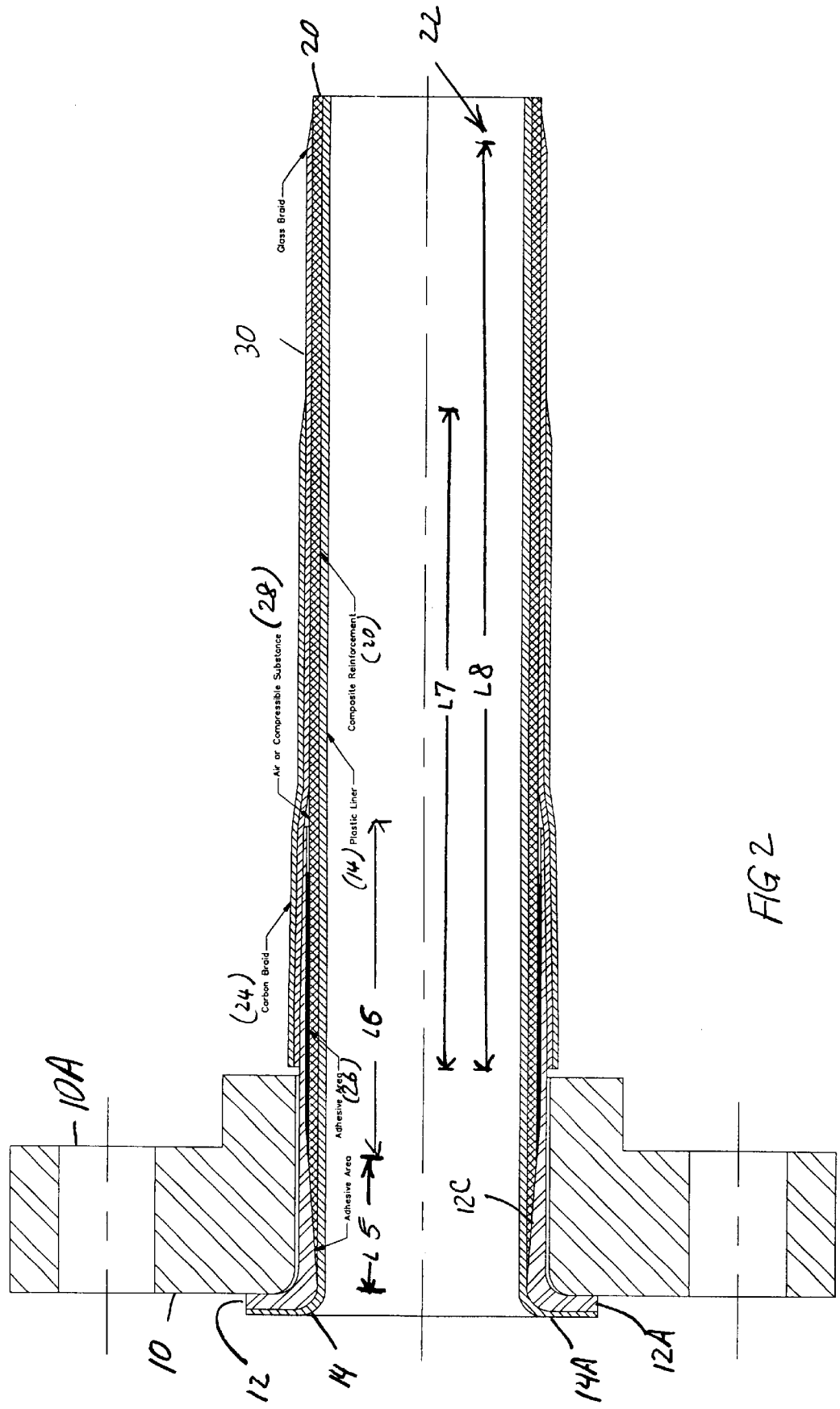
FIG. 2 shows an example of another embodiment of a connection according to the invention.

Another embodiment of the coupling formed according to the invention is shown in FIG. 2. The liner 14 is flared at 14A to correspond to the flare 12A on the stub end connector 12 as in the previous embodiment. In the present embodiment, the internal diameter of the stub end connector 12 is tapered opening in the direction away from the flared end 12A, as shown at 12C, to subtend an angle of about 5 degrees. The outside of the fiber layer 20 on the tube 22 is tapered to subtend a corresponding angle. The taper 12C is shown as extending over a length L5. In the present embodiment, the axial length of the stub end connector 12 extends past the end of the taper along a length L6. The inside diameter of the stub end connector 12 along length L6 is nominally larger, in this embodiment by about 0.030 inches (0.76 mm), than the full (untapered) outside diameter of the tube 22. This provides a space 26 which can be filled with adhesive such as 2-part epoxy or the like. The outside of the stub end connector 12 and tube 22 is then overwrapped with at least one stiffness transition layer 30, which in this embodiment is resin impregnated fiber braid, as in the first embodiment. The at least one stiffness transition layer 30 can be wrapped with shrink tape during resin cure as is the case for the first embodiment of the invention. The at least one stiffness transition layer 30 in this embodiment extends over an axial span shown as L8 in FIG. 2. In this embodiment, the at least one stiffness transition layer 30 can be itself overwrapped with a second stiffness transition layer 24. In this embodiment, as in the previous embodiment, the second stiffness transition layer 30 can be formed from resin impregnated carbon fiber braid. The second stiffness transition layer 24 is generally shorter than the at least one stiffness transition layer 30, as shown at L7, but in any event, any stiffness transition layer should extend axially at least past the end of the stub end connector 12, and preferably some distance beyond that, this minimum extra distance being nominally about twice the outer diameter of the tube 22.

A space 28, which can remain air-filled, or alternatively can be filled with a soft elastomeric material or other relatively compressible material such as sponge, is disposed past the axial end of the stub end connector 12. The space 28 provides the tube 22 with room for expansion under internal pressure without causing the connection to fail.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for coupling a stub end flanged connector to a fiber reinforced plastic pipe, comprising:

tapering an end of the fiber reinforced plastic pipe on an outside surface thereof;

correspondingly tapering an inside surface of a stub end connector;

bonding the stub end connector to the tapered end of the fiber reinforced plastic pipe;

flaring a liner of the plastic pipe to correspond to a flared end of the stub end connector; and bonding at least one stiffness transition layer over the outer surface of the stub end connector over an axial span at least including an end of the stub end connector.

2. The method as defined in claim 1 wherein the at least one stiffness transition layer comprises resin impregnated glass fiber braid.

3. The method as defined in claim 1 further comprising bonding a second stiffness transition layer on top of the at least one stiffness transition layer, the second stiffness transition layer extending a shorter axial distance than the axial span of the at least one stiffness transition layer.

4. The method as defined in claim 3 wherein the second stiffness transition layer comprises resin impregnated carbon fiber braid.

5. The method as defined in claim 1 wherein the taper on the stub end connector is formed to provide the stub end connector with an axial span having an internal diameter selected to provide an adhesive space between a full outside diameter of the plastic pipe and the inside diameter of the stub end connector, the at least one stiffness transition layer applied to an outside surface of the plastic pipe and the stub end connector to provide an expansion space at an end of the stub end connector opposite the flanged end thereof.

6. The method as defined in claim 5 wherein the expansion space is filled with compressible material.

7. The method as defined in claim 5 wherein the taper subtends an angle of about 5 degrees.

8. The method as defined in claim 1 wherein the taper subtends an angle of about 1½ degrees.

9. The method as defined in claim 1 further comprising compressing the at least one stiffness transition layer prior to the bonding.

10. The method as defined in claim 9 wherein the compressing comprising wrapping with heat shrinkable tape and heating the tape.

11. A stub end flanged connector for a wound fiber reinforced plastic pipe, comprising:

an end of the fiber reinforced plastic pipe having a taper on an outside surface thereof, a liner of the plastic pipe flared to correspond to a flared end of a stub end connector;

an inside surface of the stub end connector correspondingly tapered to the taper on the outside surface of the plastic pipe, the stub end connector bonded to the plastic pipe on the taper thereon; and at least one stiffness transition layer bonded outside the stub end connector over an axial span at least including the end of the stub end connector opposite the flared end thereof.

12. The flanged connector as defined in claim 11 wherein the at least one stiffness transition layer comprises resin impregnated glass fiber braid.

13. The flanged connector as defined in claim 1 further comprising a second stiffness transition layer bonded on top of the at least one stiffness transition layer, the second stiffness transition layer extending a shorter axial distance than the axial span of the at least one stiffness transition layer.

14. The flanged connector as defined in claim 13 wherein the second stiffness transition layer comprises resin impregnated carbon fiber braid.

15. The flanged connector as defined in claim 11 further comprising the taper on the stub end connector being formed to provide the stub end connector with an axial span having an internal diameter selected to provide an adhesive space between a full outside diameter of the plastic pipe and the inside diameter of the stub end connector, the stiffness transition layer applied to an outside surface of the plastic pipe and the stub end connector to provide an expansion space at an end of the stub end connector.

16. The flanged connector as defined in claim 15 wherein the expansion space is filled with a compressible material.

17. The flanged connector as defined in claim 15 wherein the taper subtends an angle of about 5 degrees.

18. The flanged connector as defined in claim 11 wherein the taper subtends an angle of about 1½ degrees.

* * * * *